United States Patent
Nakai et al.

(10) Patent No.: US 7,063,068 B2
(45) Date of Patent: Jun. 20, 2006

(54) VARIABLE VALVE TIMING CONTROLLER FOR AN ENGINE

(75) Inventors: Hideo Nakai, Siga (JP); Katsuhiko Miyamoto, Kyoto (JP); Yoshiyuki Hoshiba, Kyoto (JP); Katsuyuki Maeda, Siga (JP); Seiji Shiota, Kyoto (JP)

(73) Assignees: Mitsubishi Jidosha Kogyo Kabushiki Kaisha, Tokyo (JP); Mitsubishi Jidosha Engineering Kabushiki Kaisha, Kanagawa (JP)

( * ) Notice: Subject to any disclaimer, the term of this patent is extended or adjusted under 35 U.S.C. 154(b) by 0 days.

(21) Appl. No.: 10/834,009

(22) Filed: Apr. 29, 2004

(65) Prior Publication Data

US 2005/0000492 A1 Jan. 6, 2005

(30) Foreign Application Priority Data

Apr. 30, 2003 (JP) ............................. 2003-125848

(51) Int. Cl.
*F02P 5/15* (2006.01)
*F01L 1/34* (2006.01)
*F02M 51/00* (2006.01)

(52) U.S. Cl. ................. 123/406.45; 123/478; 123/315; 123/90.17

(58) Field of Classification Search ............. 123/90.11, 123/90.15, 90.16, 90.17, 90.18, 295, 305, 123/478, 489, 406.45, 491, 316, 568.14

See application file for complete search history.

(56) References Cited

U.S. PATENT DOCUMENTS

| | | | |
|---|---|---|---|
| 5,531,193 A | 7/1996 | Nakamura | |
| 5,967,114 A * | 10/1999 | Yasuoka | 123/295 |
| 6,055,948 A | 5/2000 | Shiraishi et al. | |
| 6,659,054 B1 * | 12/2003 | Sugiyama et al. | 123/90.16 |
| 6,729,304 B1 * | 5/2004 | Fujiki et al. | 123/480 |
| 2002/0000212 A1 * | 1/2002 | Shimizu et al. | 123/90.15 |

FOREIGN PATENT DOCUMENTS

| | | |
|---|---|---|
| EP | 0735246 B1 | 9/1998 |
| EP | 1164259 A1 | 12/2001 |
| JP | 2001-50040 A | 2/2001 |
| JP | 2002-13419 A | 1/2002 |

* cited by examiner

*Primary Examiner*—Willis R. Wolfe, Jr.
(74) *Attorney, Agent, or Firm*—Birch, Stewart, Kolasch & Birch, LLP

(57) ABSTRACT

A variable valve timing controller includes an intake-valve and an exhaust-valve. When the engine is started, the intake-valve and the exhaust-valve are operated in a first mode in which the exhaust-valve is closed before top dead center and then the intake-valve is opened. When a first predetermined condition is met, the intake-valve and the exhaust-valve are operated in a second mode in which the opening time of the intake-valve in the first mode is advanced before top dead center.

8 Claims, 8 Drawing Sheets

Related Art

VARIABLE VALVE TIMING CONTROLLER FOR AN ENGINE

CROSS-REFERENCE TO RELATED APPLICATION

This application incorporates by reference the subject matter of Application No. 2003-125848 filed in Japan on 30 Apr. 2003, on which priority claim is based under 35 U.S.C. § 119(a).

BACKGROUND OF THE INVENTION

1. Field of the Invention

The present invention relates to a variable valve timing controller for an engine.

2. Description of the Related Art

A wide variety of techniques have been developed and proposed in order to reduce the amount of hydrocarbon (HC) contained in the exhaust gas from an internal combustion engine. For example, Japanese Laid-Open Patent Publication No. 2002-13419 discloses a method in which exhaust gas are discharged through an intake port and an exhaust port by setting a valve overlap period (during which both an intake-valve and an exhaust-valve are open) before top dead center (TDC) (that is, before a piston reaches TDC on an exhaust stroke). It is also disclosed that with this method, the amount of HC discharged can be reduced.

Typically, HC discharged from the engine can be removed by chemically reacting the HC in a catalyst. In this case, a catalyst must be raised to a predetermined high temperature so that it is activated. If an ignition timing is retarded to raise the temperature of exhaust gas, the temperature of a catalyst can be made high.

However, the retardation of the ignition timing causes combustion within an engine cylinder to be unstable. If the amount of an internal exhaust gas recirculation (EGR) gas (i.e., an exhaust gas remaining within the engine cylinder) is reduced, combustion stability can be enhanced. The internal EGR gas within the engine cylinder can be minimized by setting a valve-overlap period to zero (i.e., when the piston reaches TDC, an exhaust-valve closes and an intake-valve opens).

Thus, with a rise in the temperature of exhaust gas by the retardation of the ignition timing and an early activation of the catalyst by the temperature increase of exhaust gas, HC generated immediately after the engine has started (particularly, when the engine is under cold conditions) can be processed by the catalyst. At the same time, engine combustion stability can also be assured.

However, if the amount of the internal EGR gas is minimized as described above, the amount of HC discharged from the engine will be increased. This problem will hereinafter be described with reference to FIG. 8.

FIG. 8*a* shows opening and closing timing of the intake-valve and the exhaust-valve as a valve-lift characteristic. The "EO" shown in the figure stands for the exhaust-valve opening; the "EC" stand for the exhaust-valve closing; the "IO" stands for the intake-valve opening; and the "IC" stands for the intake-valve closing. According to the valve lift curves shown in FIG. 8*a*, the internal EGR gas within the engine cylinder can be minimized by closing the exhaust-valve and opening the intake-valve, when the piston reaches TDC. That is, the internal EGR gas within the engine cylinder can be minimized by setting the valve-overlap period to zero. In this setting, the exhaust-valve and the intake-valve do not simultaneously open.

However, if the exhaust-valve and the intake-valve are operated along with the curve as shown in FIG. 8*a*, the amount of HC contained in the exhaust gas from the engine increases rapidly when the exhaust-valve opens (see arrow $A_1$), as shown in FIG. 8*b*. Thereafter, it is gradually reduced, but increases again rapidly when before TDC (before the exhaust-valve is closed) (see arrow $A_2$). As a result, HC discharged from the engine to the catalyst is increased if the temperature of a catalyst is raised in order to enhance processing ability of the catalyst and assure engine combustion stability.

SUMMARY OF THE INVENTION

The present invention has been made in view of the problems described above. Accordingly, the present invention provides a variable valve timing controller capable of controlling the amount of HC discharged from an engine.

To achieve this end, there is provided a variable valve timing controller for use in an internal combustion engine with an intake-valve and an exhaust-valve. The variable valve timing controller comprises a valve-over-lap setting controller for setting an operation mode for lifting of the intake-valve and exhaust-valve and a variable valve timing mechanism controller for operating the intake-valve and the exhaust-valve individually according to the operation mode set by the valve-over-lap setting controller. The valve-over-lap setting controller sets the operation mode to a first mode when the engine is just started, and if a first predetermined condition is met after the first mode is set then the valve-over-lap setting controller changes the operation mode to a second mode.

Therefore, just after the engine is started, the amount of HC discharged from the engine can be reduced by reducing the amount of exhaust gas discharged to an exhaust manifold. In addition, compressed exhaust gas can flow into an intake port. This can facilitate atomization of fuel in the intake port and reduce the amount of HC discharged. After the first mode, the operating mode of the intake-valve and the exhaust-valve are switched to the second mode. Therefore, while the amount of HC discharged is being reduced, combustion stability of engine can be assured and fuel consumption can be enhanced.

As a first preferred form of the present invention, the valve-over-lap setting controller sets the first mode, which instructs the variable valve timing mechanism controller so that at least one-half of a period, from the closing time of the exhaust-valve to the opening time of the intake-valve, is set during an exhaust stroke of the engine.

This arrangement makes the exhaust gas flowing into the intake port and atomization of fuel in the intake port is accelerated.

As a second preferred form of the present invention, the valve-over-lap setting controller sets the first mode, which instructs the variable valve timing mechanism controller operating so that the intake-valve is opened the timing of top dead center.

This makes it possible to compress exhaust gas at high pressure.

As a third preferred form of the present invention, the second mode, which instructs the variable valve timing mechanism controller operating so that the closing time of the exhaust-valve and the opening time of the intake-valve are same.

This can assure a combined stability of the engine and enhance fuel consumption.

As a fourth preferred form of the present invention, the first and second modes, which instruct said variable valve timing mechanism controller operating so that an air/fuel ratio is set to a stoichiometric ratio and a ignition timing is retarded.

This can raise the temperature of exhaust gas, assure the combustion stability of the engine, and contribute to the enhancement of fuel consumption.

As a fifth preferred form of the present invention, when a second predetermined condition is met during the second mode, the valve-over-lap setting controller sets the third mode which instructs the variable valve timing mechanism controller so that the closing timing of the exhaust-valve is shifted after the timing of top dead center.

This can operate the engine by selecting an optimum operating mode in dependence on the operating conditions of the engine.

BRIEF DESCRIPTION OF THE DRAWINGS

The present invention will be described in further detail with reference to the accompanying drawings wherein:

FIG. 8b is a graph showing how the amount of HC contained in the exhaust gas from the engine varies when the intake- and exhaust-valves open and close as shown in FIG. 8a.

DETAILED DESCRIPTION OF THE INVENTION

A variable valve timing controller (VVT controller) constructed in accordance with an embodiment of the present invention will be described by referring to FIGS. 1 through 7.

Figure 1:
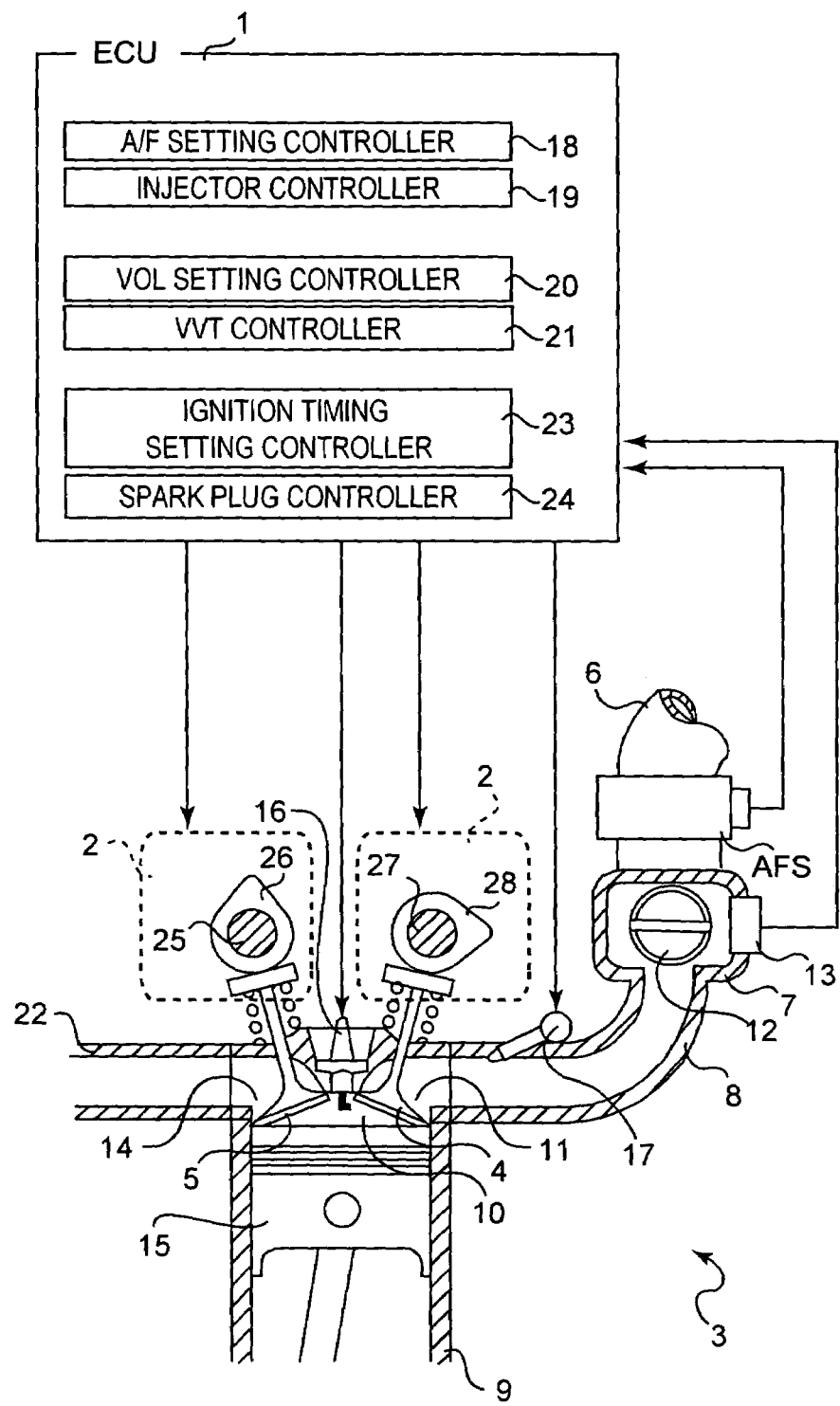
FIG. 1 is a block diagram showing a variable valve timing controller constructed in accordance with a preferred embodiment of the present invention.

The VVT controller includes an electronic control unit (ECU) 1 and variable valve timing mechanisms (VVT mechanisms) 2, as shown in FIG. 1. Each of the VVT mechanisms 2 is, e.g., a vane-type VVT mechanism. They are respectively interposed between an exhaust camshaft 25, which drives an exhaust cam 26, and an exhaust cam sprocket (not shown) and between an intake camshaft 27, which drives an intake cam 28 and an intake cam sprocket (not shown). By the VVT mechanisms 2, the phase of the exhaust cam 26, which drives an exhaust-valve 5, with respect to a crankshaft (not shown) and the phase of the intake cam 28, which drives an intake-valve 4, with respect to the crankshaft can be varied. Accordingly, the intake- and exhaust-valves 4 and 5 can be opened and closed independently at different times.

Note that since many different types of mechanism 2 can be applied, a detailed description of them will not be given. They are not limited to a type that can continuously change the time at which the intake-valve 4 is opened and the time at which the exhaust-valve is closed, but may be a type that selects proper times from a plurality of previously set times at which the intake- and exhaust-valves 4 and 5 are opened and closed.

The intake system of an engine 3 includes an intake pipe 6, a surge tank 7, and an intake manifold 8. The intake manifold 8 has an intake port 11 at its downstream end. If the intake-valve 4 is opened, the intake manifold 8 communicates with a combustion chamber within a cylinder 9, through the intake port 11. The intake system is further provided with a throttle valve 12 for regulating the amount of air taken in the combustion chamber 10 in dependence on the opening degree of an accelerator pedal (i.e., the amount that the accelerator pedal is depressed; a throttle valve position sensor 13 for detecting the opening degree of the throttle valve 12; and an air flow sensor AFS for detecting the amount of air taken in.

The exhaust system of the engine 3 includes an exhaust manifold 22, etc. The exhaust manifold 22 has an exhaust port 14 at its upstream end. If the exhaust-valve 4 is opened, the exhaust manifold 22 communicates with the combustion chamber 10 through the exhaust port 14. In addition, there is provided a three-way catalytic converter (catalytic converter) rhodium (not shown) on the downstream side of the exhaust manifold 22 to convert harmful pollutants in the exhaust gas into less harmful ones.

The engine 3, in addition to the above-described intake system, exhaust system, cylinder 9, and combustion chamber 10, includes a piston 15, a spark plug 16, and an injector 17. Note that the engine 3 is an MPI (multi-point injection) where the injector is provided in the intake port. Although not shown, the engine 3 is also equipped with a crank angle sensor, a throttle position sensor, etc.

The ECU 1 contains an air/fuel ratio setting controller (A/F ratio setting means) 18, an injector controller (injector control means) 19, a valve-overlap setting controller (VOL setting means) 20, a variable valve timing controller (VVT mechanism control means) 21, an ignition-timing setting controller (ignition-timing setting means) 23, and a spark plug controller (spark plug control means) 24. Though not shown, the ECU 1 is also equipped with an input/output unit, a storage unit for storing control programs and control maps, a central processing unit (CPU), etc. This ECU 1 controls the engine 3 in dependence on the results of detection obtained by various sensors.

In the ECU 1, the A/F ratio setting controller 18 sets a target A/F ratio. The injector controller 19 controls the injector 17 so that the target A/F ratio set by the A/F ratio setting controller 18 is obtained.

The ignition-timing setting controller 23 sets a target ignition time. In dependence on the target ignition time set by the ignition-timing setting controller 23, the spark plug controller 24 controls the ignition time at which the compressed air-fuel mixture within the combustion chamber 10 is ignited by the spark plug 16. In this specification, when the compressed air-fuel mixture is ignited at TDC on the compression stroke, the ignition time is referred to as a reference time. Also, ignition after the reference time is referred to as ignition retard. On the other hand, ignition before the reference time is referred to as ignition advance.

The VOL setting controller 20 sets the valve-overlap (VOL), as an operation mode, between the intake-valve 4 and the exhaust-valve 5. If VOL=0, the intake-valves 4 opens and the exhaust-valve 5 closes at the same time. If VOL<0, the intake-valve 4 opens after the exhaust-valve 5 closes. In the case of VOL<0, the period from the closing time of the exhaust-valve 5 to the opening time of the intake-valve 4 is referred to as negative-valve-overlap (NVOL). During the negative-valve-overlap, both the exhaust-valve 5 and the intake-valve 4 are closed, so the air-fuel mixture cannot flow in and out of the combustion chamber 10.

The variable valve timing controller 21 controls the VVT mechanisms 2 in dependence on both the valve-overlap (or negative-valve-overlap) set by the VOL setting controller 20 and the position of the piston 15 detected by the crank angle sensor (not shown).

In the embodiment, the variable valve timing controller 21 operates the intake- and exhaust-valves 4 and 5 according to one of the following three modes set by the variable valve timing controller 20:

(I) First mode in which a negative-valve-overlap period is set so that the exhaust-valve 5 is closed before TDC and the intake-valve 4 is opened near TDC;

(II) Second mode in which a valve-overlap period is made nearly zero (VOL=0) so that the opening time of the intake-valve 4 (IO) in the first mode is advanced before TDC; and (III) Third mode in which the closing time of the exhaust-valve 5 (EC) in the second mode is retarded after TDC.

Now, the control of the VVT mechanisms 2 by the VVT controller 21 will be described with reference to FIG. 2*a*.

As shown in the figure, in the first mode, the exhaust-valve 5 is closed at EC, and if the period of negative-valve-overlap set by the VOL setting controller 20 elapses, the intake-valve 4 is opened. In this case, the exhaust-valve 5 is closed before the piston 15 reaches TDC, and the intake-valve 4 is opened at the same time when the piston 15 reaches TDC. That is, the exhaust gas remaining within the cylinder 9 during the period of negative-valve-overlap are compressed, so that the exhaust gas can rush into the intake port 11. If the compressed exhaust gas rushes into the intake port 11, possible droplets of fuel adhering to the interior wall of the intake port 11 are easily atomized. Since the droplets of fuel are prevented from flowing in the cylinder 9, the amount of HC contained in the exhaust gas can be reduced.

Note that HC is contained in the exhaust gas from the engine, for example, in the case (1) where, when the engine is started under cold conditions, droplets of fuel adhering to the interior wall of the intake port 11 flows in the combustion chamber 10 without being atomized and therefore imperfect combustion takes place, or in the case (2) where fuel remains in a piston clevis without being perfectly burned.

Hence, in the case (1), in order to prevent the droplets of fuel adhering to the interior wall of the intake port 11 from flowing in the combustion chamber 10 without being atomized, the VVT mechanisms 2 are controlled so that when the engine 3 is started, the intake- and exhaust-valves 4 and 5 are operated in the first mode. This causes the high-temperature exhaust gas to rush into the intake port 11.

Figure 2A:
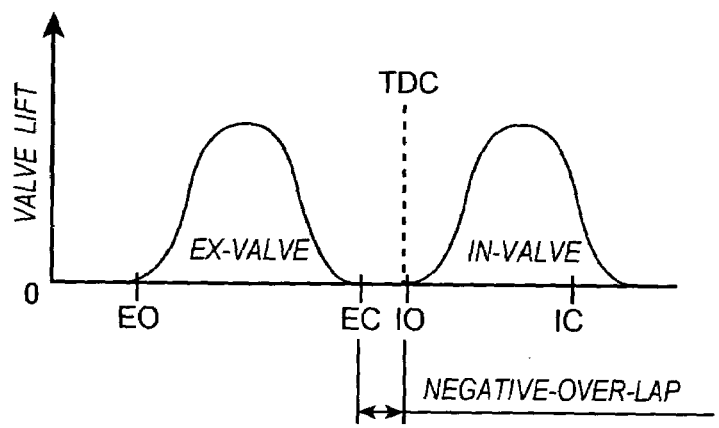
FIG. 2a is a timing diagram showing a first mode in which the exhaust and intake-valves are operated by the variable valve timing controller shown in FIG. 1.

That is, as shown in FIG. 2*a*, in the first mode, the exhaust-value 5 and the intake-valve 4 are closed when the piston 15 is moving up toward TDC on the exhaust stroke. Therefore, during the period between EC and TDC, the exhaust gas is compressed. Then the intake-valve 4 is opened when the piston 15 reaches TDC, so that the compressed exhaust gas can rush into the intake port 11. Because of this, the droplets of fuel adhering to the wall surface of the intake port 11 are mixed with air. Since droplets of fuel are reliably atomized, imperfect combustion can be prevented and the amount of HC can be reduced.

In order to compress the exhaust gas and rush it into the intake port 11, after the period of negative-valve-overlap, the intake-valve 4 does not always need to be opened at TDC, precisely. However, if the intake-valve 4 is opened just before or after of TDC, the exhaust gas can be compressed at high pressure.

After the period of negative-valve-overlap, the opening time of the intake-valve 4 can be freely set in dependence on a target speed at which exhaust gas flow in the intake port 11. That is, even in the case where the exhaust-valve 5 is closed on the exhaust stroke and the intake-valve 4 is opened before the piston 15 reaches TDC on the exhaust stroke, exhaust gas is still compressed and rushes into the intake port 11. In this case, the compression ratio of the exhaust gas can be reduced compared with the case where the intake-valve 4 is opened at the same time when the piston 15 reaches TDC, so the flow speed of the exhaust gas with respect to the intake port 11 can be suitably regulated.

On the other hand, even in the case where the exhaust-valve 5 is closed on the exhaust stroke and the intake-valve 4 is opened slightly after TDC (i.e., on the intake stroke), exhaust gas is compressed and flows in the intake port 11, if one-half or more of the period of negative-valve-overlap is set before the piston 15 reaches TDC on the exhaust stroke. Similarly, the compression ratio of the exhaust gas can be reduced compared with the case where the intake-valve 4 is opened at the same time when the piston 15 reaches TDC. This makes it possible to arbitrarily regulate the speed at which exhaust gas flow in the intake port 11.

Figure 8A:
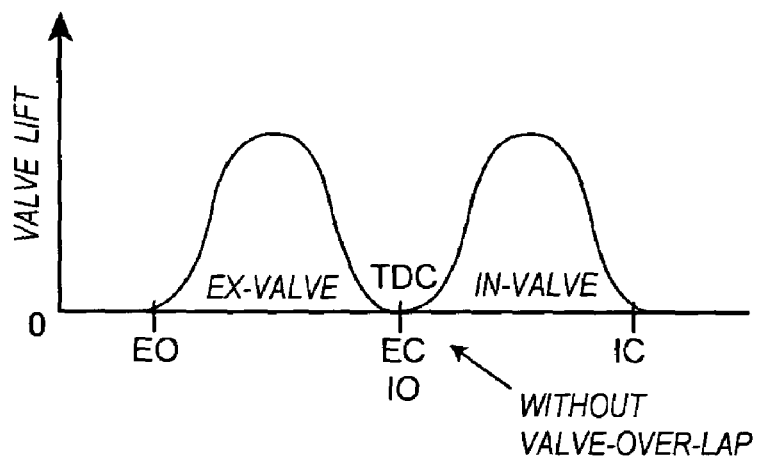
FIG. 8a is a timing diagram showing how the intake- and exhaust-valves of an engine are opened and closed by conventional variable valve timing mechanisms.

In addition, if the VVT mechanisms 2 are controlled so that the intake- and exhaust-valves 4 and 5 operate in the first mode, the above-described case (2) can be prevented. That is, fuel can be prevented from remaining within the piston clevis without being perfectly burned and from causing HC to occur. As described with reference to FIG. 8, the reason why the amount of HC contained in exhaust gas increases rapidly immediately before the piston 15 reaches TDC on the exhaust stroke (see arrow $A_2$ in FIG. 8) is that HC (e.g., unburned fuel and oil) adhering to the interior wall of the cylinder is collected on the exhaust stroke by the piston ring and is discharged through the exhaust port 14 along with exhaust gas.

On the other hand, in the first mode shown in FIG. 2*a*, the exhaust-valve 5 is closed before the piston 15 reaches TDC on the exhaust stroke, so HC collected by the piston ring is prevented from being discharged through the exhaust port 14. Also, the intake-valve 4 is opened after the negative-valve-overlap period, so HC flows in the intake port 11. The HC that flowed in the intake port 11 is agitated and atomized within the intake port 11 and is burned on the next power stroke.

Figure 2B:
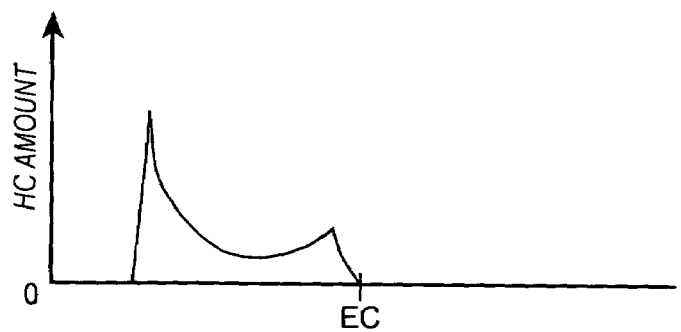
FIG. 2b is a graph showing the amount of HC contained in exhaust gas that are discharged from the engine when a variable valve timing mechanism (VVT mechanism) are controlled according to the first mode by the variable valve timing controller shown in FIG. 1.
Figure 8B:
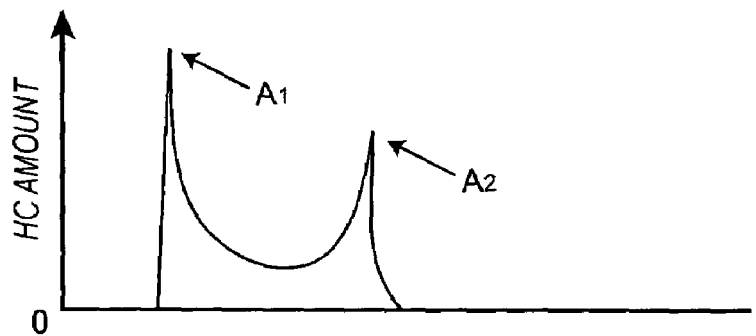

In this way, as shown in FIG. 2*b*, when the exhaust-valve 5 is closed, the amount of HC that is discharged from the engine 3 can be significantly reduced compared to prior art (see FIG. 8*b*).

If a predetermined time elapses after the engine 3 is operated in the first mode, the first mode is switched to the second mode in order to enhance combustion stability. Now, a switch from the first mode shown in FIG. 2a to the second mode shown in FIG. 3 will be described. Immediately after the engine 3 is started, the intake- and exhaust-valves 4 and 5 are operated (opened or closed) according to the first mode by the VVT controller 21 of the ECU 1. Thereafter, the first mode is switched to the second mode shown in FIG. 3.

Figure 3:
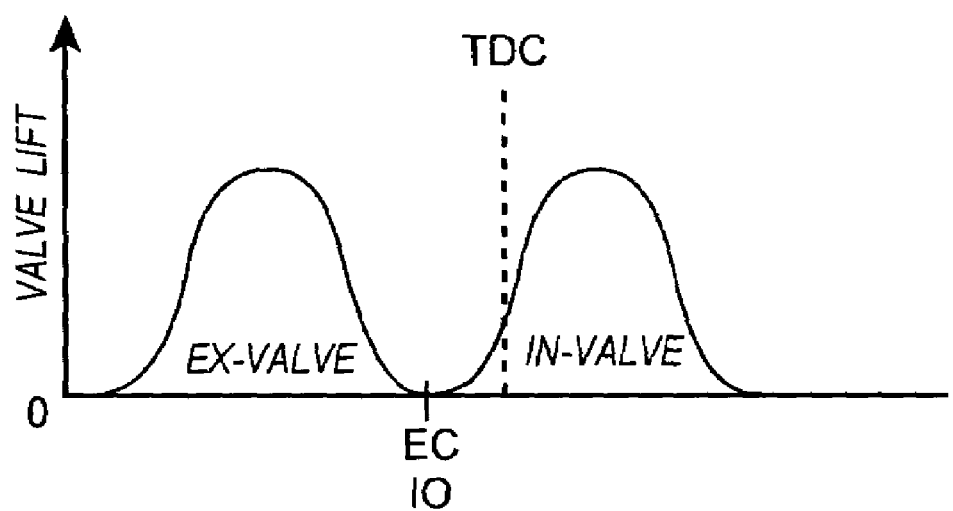
FIG. 3 is a timing diagram showing a second mode in which the exhaust and intake-valves are operated by the variable valve timing controller shown in FIG. 1.

As shown in FIGS. 2a and 3, the second mode is characterized in that the opening time of the intake-valve 4 in the first mode is advanced. More specifically, the intake-valve 4 is opened before the piston 15 reaches TDC on the exhaust stroke; the negative-valve-overlap period set in the first mode is set to zero (VOL=0); and the intake-valve 4 is opened at the same time as when the exhaust-valve 5 is closed.

The second mode differs from the first mode in that exhaust gas which flows in the intake port 11 are not compressed. If a predetermined time elapses after the engine 3 is started, the temperature of the engine 3 rises and therefore the temperature of the interior wall of the intake port 11 rises. Since small droplets of fuel adhering to the interior wall are easily atomized, it is not necessary to cause exhaust gas to rush into the intake port 11, as in the first mode set immediately after the engine 3 is started. Therefore, the process of compressing exhaust gas is omitted by controlling the VVT mechanisms 2 so that the first mode is switched to the second mode. This can prevent energy loss and contribute to the enhancement of fuel consumption.

As in the above-described first and second modes, if the exhaust-valve 5 is closed before the piston 15 reaches TDC, exhaust gas remain within the combustion chamber 10 and the remaining exhaust gas (hereinafter referred to as internal exhaust gas recirculation (EGR) gas) is burned on the power stroke. However, if the amount of internal EGR gas increases excessively, there is a possibility that combustion stability will diminish. Because of this, the present invention has been made so that even when the amount of internal EGR gas is increased, combustion stability will not diminish. In connection with this, the combustion stability of the engine 3 in operating the engine 3 according to the above-described first mode and second mode will be described with reference to FIG. 4.

Figure 4:
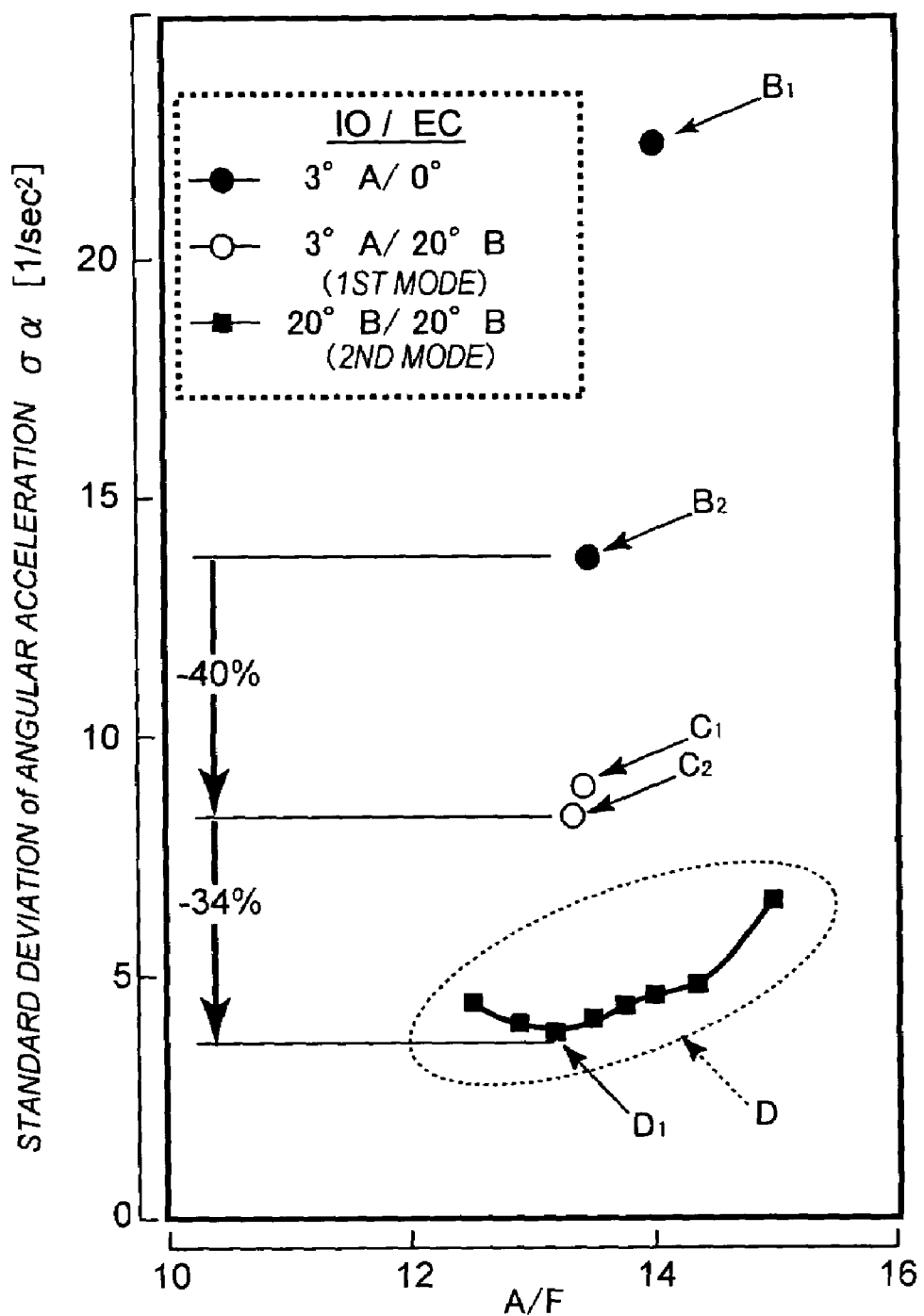
FIG. 4 is a graph showing the operating modes of the variable valve timing controller, air/fuel ratio, and combustion stability.

FIG. 4 shows the combustion stability in the case where the engine is started at subzero temperatures. The ordinate represents a standard deviation in angular acceleration a a and the abscissa represents an A/F ratio. This standard angular acceleration deviation σα indicates the combustion stability of the engine. The smaller the numerical value, the higher the combustion stability. Note that in the measurements shown in FIG. 4, the spark plug 16 was ignited at 7° after top dead center (ATDC).

Initially, if the A/F ratio is made nearly 14.0, the intake-valve 4 is opened at 3° after TDC, and the exhaust-valve 5 is closed at 0°, the standard angular acceleration deviation σα is about 22.5 (1/sec$^2$), as indicated by arrow $B_1$ in FIG. 4. Thus, it can be seen that the combustion stability is degraded. Because of this, if the A/F ratio is made slightly rich (A/F ratio=13.5), the standard angular acceleration deviation σα is about 14.0 (1/sec$^2$), as indicated by arrow $B_2$. Thus, combustion stability is enhanced.

Next, if the A/F ratio is made about 13.5, the intake-valve 4 is opened at 3° after TDC (IO=3° ATDC), and the exhaust-valve 5 is closed at 20° before TDC (EC=20° BTDC) (see arrow $C_1$), the combustion stability can be significantly enhanced. Furthermore, if the injector 17 is controlled so that the A/F ratio becomes slightly rich with IO=3° ATDC and EC=20° BTDC, combustion stability can be further enhanced as indicated by arrow $C_2$.

If the condition indicated by arrow $B_2$ (where IO=3° ATDC, EC=0°, and A/F ratio=14.0) is compared with the condition indicated by arrow $C_2$ (where IO=3° ATDC, EC=20° BTDC, and A/F ratio=14.0), it is found that combustion stability can be enhanced by about 40%.

Thus, if the intake- and exhaust-valves 4 and 5 are controlled in the first mode in dependence on the parameters indicated by arrow $C_2$, and the amount of fuel squirted by the injector 17 is controlled, combustion stability can be enhanced.

Furthermore, the intake-valve 4 was opened at 10° before TDC, 20° before TDC, 30° before TDC, and 40° before TDC, from the condition indicated by arrow $C_2$ (where IO=3° ATDC, EC=20° BTDC, and A/F ratio=14.0). At the same time, the A/F ratio was varied in the range of 12 to 15 (see arrow D). When IO=10° BTDC, EC=20° BTDC, and A/F ratio=12.5 to 13.25, it has been found that the combustion stability becomes very high. That is, it has been found that, when the condition indicated by arrow $D_1$ (where IO=EC=20° BTDC and A/F ratio=12.5 to 13.25) is compared with the condition indicated by arrow $C_2$ (where IO=3° ATDC, EC=20° BTDC, and A/F ratio=14.0), the combustion stability in the condition indicated by arrow $D_1$ can be further enhanced about 34%.

Therefore, by controlling the intake- and exhaust-valves 4 and 5 in the second mode employing the parameters indicated by arrow D and controlling the injector 17, high combustion stability can be achieved.

Thus, immediately after the engine 3 is started, if the A/F ratio is made rich in the first mode (where the negative-valve-overlap period is set so that the exhaust-valve 5 is closed before TDC and then the intake-valve 4 is opened). This makes it possible to reduce the amount of HC contained in exhaust gas and assure combustion stability. In addition, in this case, if at least one-half of the negative-valve-overlap period is set on the exhaust stroke, exhaust gas can rush into the intake port 11. In addition, in this case, if the intake-valve 4 is opened near TDC, the exhaust gas remaining within the combustion chamber 10 after closing the exhaust-valve 5 can be compressed at high pressure.

With the second mode where the intake-valve 4 is opened before TDC, the combustion stability of the engine 3 can be further enhanced. At this time, if the second mode is set so that the intake-valve 4 is opened at the same time as when the exhaust-valve 5 is closed, that is, so that the valve-overlap period is zero, the combustion stability of the engine 3 can be assured and the amount of HC contained in the exhaust gas can be reliably reduced.

As described with reference to FIG. 4, it is preferable from the standpoint of combustion stability that the VVT mechanisms 2 be operated in the second mode instead of the first mode. Because of this, it is contemplated that the VVT mechanisms 2 are operated in only the second mode instead of employing the first mode. However, in the present invention, after the start of the engine 3 the VVT mechanisms 2 are first operated according to the first mode. After first predetermined conditions (e.g., the operating time from the start of the engine 3, the temperature of cooling water, etc.) have been met, the first mode is switched to the second mode. That is, there is no possibility that the VVT mechanisms 2 will be operated in the second mode immediately after the engine 3 is started. The reason for that will hereinafter be described with reference to FIG. 5.

In the figure, the total HC, contained in exhaust gas discharged to the exhaust manifold 2 within a predetermined time (e.g., 125 seconds) after the start of the engine 3 under cold conditions, is plotted against the closing time of the exhaust-valve 5 (EC) and the opening time of the intake-valve 4 (IO). The arrow E in FIG. 5 indicates the total HC in the first mode where IO=3° ATDC and EC=20° BTDC.

Figure 5:
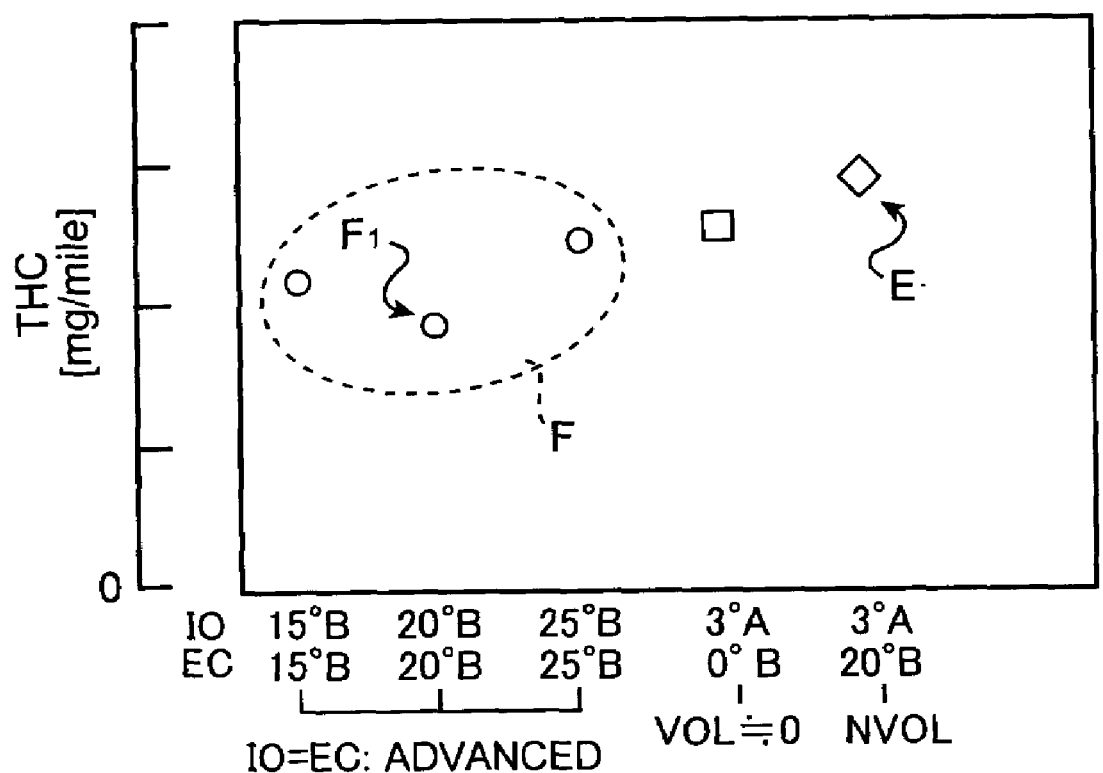
FIG. 5 is a graph showing the relationship between the operating modes of the variable valve timing controller and the amount of HC contained in exhaust gas.

On the other hand, the arrow F in FIG. 5 indicates the total HC in the case where the first mode is switched to the second mode in which the intake-valve 4 is opened before TDC. By referring to FIG. 5, it can be seen that the total HC can be minimized in the second mode where IO=EC=20° BTDC.

That is, as shown in FIG. 5, if the total HC in only the first mode (where IO=3° ATDC and EC=20° BTDC) indicated by arrow E is compared with the total HC (indicated by arrow F) obtained by controlling the VVT mechanisms 2 so that the first mode is switched to the second mode (where IO=EC=15° BTDC, 20° BTDC, or 25° BTDC), it is found that the total HC in the case indicated by arrow F is less than that of the case indicated by arrow E. It is also seen from FIG. 5 that the total HC can be reduced significantly in the second mode where IO=EC=20° BTDC (see arrow $F_1$).

Therefore, according to the present invention, the amount of HC can be reduced reliably and significantly when the engine 3 is started under cold conditions, by setting the first mode (where IO=3° ATDC and EC=20° BTDC), setting the second mode (where IO=EC=20° BTDC), and switching from the first mode to the second mode.

The VVT controller 21 also controls the VVT mechanisms 2 along with the third mode after the second mode. The third mode is one of a plurality of modes by which the VVT mechanisms 2 are controlled. In the third mode, the opening time of the intake-valve 4 (IO) in the second mode remains the same, and only the exhaust-valve 5 is closed after TDC.

When second predetermined conditions are met, the second mode is switched to the third mode. For instance, when the revolution speed of the engine 3 is a predetermined revolution speed or greater, or when the vehicle speed is a predetermined speed or greater, a switch from the second mode to third mode is made. That is, the second conditions are met when the amount of exhaust gas supplied to a catalyst is considerably increased compared with that during idling. If the second conditions are met, a large quantity of exhaust gas is supplied to a catalyst and therefore the temperature of the catalyst rises rapidly and reaches activating temperatures. In this way, HC is reliably removed by the catalyst, so the engine 3 can operate normally.

That is, in order to reduce the amount of discharged HC discharged, in addition to reducing the amount of HC contained in the exhaust gas discharged from the engine 3, it is also effective to remove HC by a catalyst. However, until a catalyst reaches an activating temperature (e.g., 300° C.), its ability to remove HC is low. Because of this, it is necessary to raise the temperature of a catalyst rapidly to activating temperatures. Therefore, it is effective to raise the temperature of exhaust gas.

Hence, in the present invention, in addition to controlling the VVT mechanisms 2, ignition is performed at a predetermined angle (e.g., 10° after top dead center) so that the temperature of exhaust gas is positively raised. On the other hand, if ignition timing is retarded, combustion stability becomes low. However, in the present invention, the A/F ratio is increased to the vicinity of a stoichiometric ratio in order to compensate for the combustion stability that became low because of the ignition retard (or retard angle).

In addition, if a predetermined time elapses after a switch to the second mode, a switch from the second mode to the third mode is made and the engine 3 is operated under normal valve timing conditions.

Now, operation of the variable valve timing controller of the embodiment will be described with reference to FIGS. 6 and 7.

Figure 6:
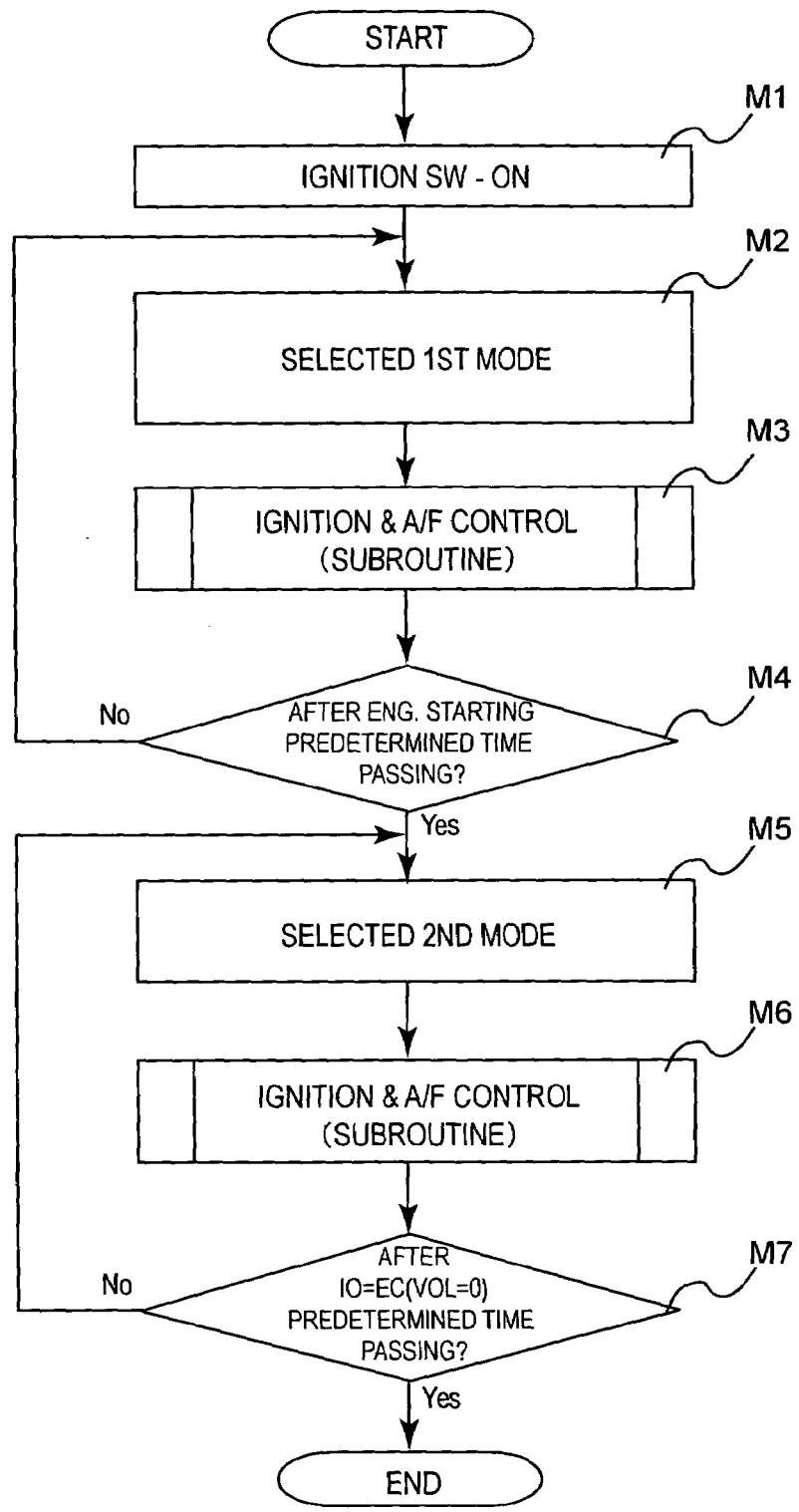
FIG. 6 is a flowchart of a main routine showing how the variable valve timing controller is operated.

As shown in FIG. 6, the ignition switch is first turned on (step M1). In step M2, the VVT controller 21 controls the VVT mechanisms 2 so that the operating mode of the intake- and exhaust-valves 4 and 5 is set to the first mode where EC=20° BTDC and IO=3° ATDC (see FIG. 2a).

Figure 7:
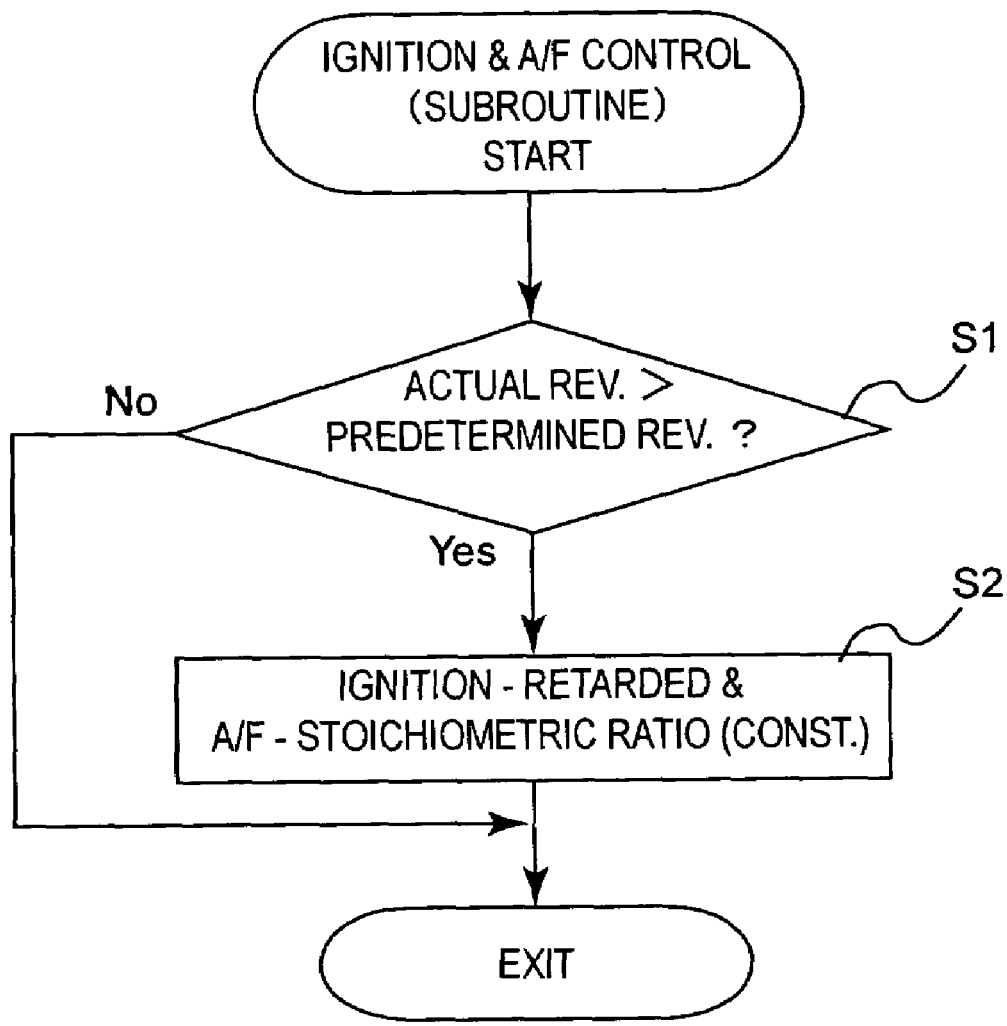
FIG. 7 is a flowchart of a subroutine showing how the variable valve timing controller shown operated.

In step M3, ignition timing and A/F ratio control are performed as shown in FIG. 7. Initially, it is judged whether or not the revolution speed of the engine 3 is a predetermined revolution speed or greater (step S1). If the engine revolution speed is less than the predetermined revolution speed, this subroutine is finished and step M4 in the main routine shown in FIG. 6 is carried out. On the other hand, if the engine revolution speed is the predetermined revolution speed or greater, step S2 is carried out. In step S2, the spark plug 16 is controlled so that the ignition timing is retarded, and the injector 17 is controlled so that the A/F ratio becomes constant in the vicinity of a stoichiometric ratio (theoretical air/fuel ratio). This subroutine is finished and step M4 in the main routine shown in FIG. 6 is executed.

In step M4, it is judged whether or not a predetermined time has elapsed after the engine 3 is started, that is, whether or not first predetermined conditions are met. If this predetermined time has not elapsed, step M2 is carried out once again. On the other hand, if this predetermined time has elapsed, step M5 is carried out.

In step M5, the operating mode of the intake- and exhaust-valves 4 and 5 is switched to the second mode. That is, with the closing time of the exhaust-valve 5 (EC) maintained, the opening time of the intake-valve 4 (IO) is advanced. Thus, the VVT mechanisms 2 are controlled so that EC and IO are simultaneously performed. That is, in step M5, the valve-overlap (VOL) period between EC and IO is set to zero (see FIG. 3).

If, in step M5, the VVT mechanisms 2 are controlled so that the first mode is switched to the second mode, the main routine advances to step M6, which is carried out in the same manner as step M3. That is, if the engine revolution speed is the predetermined revolution speed or greater, the spark plug 16 is controlled so that the ignition timing is retarded, and the injector 17 is controlled so that the A/F ratio becomes constant in the vicinity of a stoichiometric ratio.

In step M7, it is judged whether or not a predetermined time has elapsed after a switch from the first mode to the second mode, that is, whether or not second predetermined conditions are met. If this predetermined time has not elapsed, step M5 is carried out once again. On the other hand, if this predetermined time has elapsed, the main routine shown in FIG. 6 is finished.

That is, in this case, the operating mode of the intake- and exhaust-valves 4 and 5 is switched to the third mode according to normal operation. Note that the third mode is a typical operating mode in which EC and IO overlap with top dead center as center.

According to the embodiment described above, just after starting of the engine 3, the VVT mechanisms 2 are controlled so that the operating mode of the intake- and exhaust-valves 4 and 5 is set to the first mode. In this way, the amount of HC discharged can be reduced by reducing the amount of exhaust gas that are discharged to the exhaust manifold, and compressed internal EGR gas (exhaust gas remaining within the combustion chamber) can flow into the intake port 11. This can atomize fuel easily. In addition, the operating mode of the intake- and exhaust-valves 4 and 5 is switched to the second mode after the first mode. This can reduce the amount of HC discharged, assure engine combustion stability, and enhance fuel consumption.

In the first mode, one-half or more of the period from the closing time of the exhaust-valve 5 (EC) to the opening time of the intake-valve 4 (IO) is set on the exhaust stroke, so internal EGR gas can be reliably compressed so that they can rush into the intake port 11. This renders it possible to further accelerate the atomization of fuel within the intake port 11.

In the first mode, if the intake-valve 4 is opened near TDC, it becomes possible to compress internal EGR gas at high pressure. According to the embodiment, in the first mode it is preferable to set EC=20° BTDC and IO=3° ATDC.

In the second mode, the VOL setting controller 20 of the ECU 1 sets the valve-overlap period to approximately zero. Therefore, the combustion stability of the engine can be assured, while the amount of HC discharged from the engine is being reduced.

In the first mode and second mode, the A/F ratio is set to a stoichiometric ratio by the A/F ratio setting controller 18 of the ECU 1, and the ignition timing is retarded by the ignition-timing setting controller 23 of the ECU 1. Therefore, while the amount of HC discharged from the engine is being reduced, the temperature of exhaust gas can be raised, and the combustion stability of the engine can be assured. In addition, since a catalyst provided in the exhaust system of the engine can reach activating temperatures quickly by raising the temperature of exhaust gas, the start of the HC-removing process by the catalyst is quickened and therefore the amount of HC contained in exhaust gas that is discharged from the catalyst can be reduced.

If the second predetermined conditions are met after the valve timing characteristics are set to the second mode by the VVT mechanisms 2, the second mode is switched to the third mode where the closing time of the exhaust-valve 5 (EC) is retarded after TDC with the opening time of the intake-valve 4 (IO) maintained. In this case, EC and IO overlap each other with TDC as center, whereby the engine 3 can be operated at enhanced intake efficiency and exhaust efficiency.

While the present invention has been described with reference to the embodiment thereof, the invention is not to be limited to the details given herein, but may be modified within the scope of the invention hereinafter claimed.

In the embodiment, the first mode is always executed when the engine 3 is started. However, the present invention is not limited to this. For instance, only when the engine is started under cold conditions, the first mode may be carried out. On the other hand, when the engine is started under warm conditions, the second mode may be carried out without executing the first mode. In this way, the combustion stability of the engine can be reliably assured in dependence on engine temperature.

What is claimed is:

1. A variable valve timing controller for controlling operation of an intake-valve and an exhaust-valve equipped with an engine, comprising:
    a valve-over-lap setting controller for setting an operation mode for lift timing of said intake-valve and exhaust-valve; and
    a variable valve timing mechanism controller for operating said intake-valve and said exhaust-valve individually according to the operation mode set by said valve-over-lap setting controller, wherein
    said valve-over-lap setting controller sets the operation mode to a first mode when the engine is just started, and
    if a first predetermined condition is met after the first mode is set then
    said valve-over-lap setting controller resets the operation mode from the first mode to a second mode,
    wherein, said valve-over-lap setting controller sets the first mode, which instructs said variable valve timing mechanism controller so that at least one-half of a period, from the closing time of said exhaust-valve to the opening time of said intake-valve, is set during an exhaust stroke of the engine.

2. The variable valve timing controller as set forth in claim 1, wherein, in the first mode, said valve-over-lap setting controller instructs said variable valve timing mechanism controller operating, such that said intake-valve is opened at the top dead center.

3. The variable valve timing controller as set forth in claim 1, wherein, in the second mode, said valve-over-lap setting controller instructs said variable valve timing mechanism controller, such that the closing time of said exhaust-valve and the opening time of said intake-valve are the same.

4. The variable valve timing controller as set forth in claim 1, wherein, in the first mode and the second mode, an air/fuel ratio is set to a stoichiometric ratio and an ignition timing is retarded.

5. The variable valve timing controller as set forth in claim 1, wherein the first predetermined condition is a predetermined time after start of an engine.

6. The variable valve timing controller as set forth in claim 1, wherein the first predetermined condition is a predetermined time after start of an engine under a cold condition.

7. The variable valve timing controller as set forth in claim 1, wherein, when a second predetermined condition is met during said second mode, said valve-over-lap setting controller sets a third mode which instructs said variable valve timing mechanism controller, such that the closing timing of said exhaust-valve is shifted to a timing after the top dead center.

8. The variable valve timing controller as set forth in claim 7, wherein the second predetermined condition is one of a predetermined time after a start of the second mode, a revolution speed of the engine reaches a predetermined revolution speed, and a vehicle speed reaches a predetermined speed.

* * * * *